No. 692,715. Patented Feb. 4, 1902.
T. C. SARGEANT.
FERTILIZER, SEED, AND GRAIN DISTRIBUTER.
(Application filed Aug. 8, 1901.)

(No Model.) 2 Sheets—Sheet 1.

WITNESSES. INVENTOR.

No. 692,715. Patented Feb. 4, 1902.
T. C. SARGEANT.
FERTILIZER, SEED, AND GRAIN DISTRIBUTER.
(Application filed Aug. 8, 1901.)

(No Model.) 2 Sheets—Sheet 2.

WITNESSES. INVENTOR.

UNITED STATES PATENT OFFICE.

THOMAS CHARLES SARGEANT, OF NORTHAMPTON, ENGLAND.

FERTILIZER, SEED, AND GRAIN DISTRIBUTER.

SPECIFICATION forming part of Letters Patent No. 692,715, dated February 4, 1902.

Application filed August 8, 1901. Serial No. 71,354. (No model.)

*To all whom it may concern:*

Be it known that I, THOMAS CHARLES SARGEANT, a subject of His Majesty the King of Great Britain, residing at Northampton, in the county of Northampton, England, have invented a new and useful Improvement in Fertilizer, Seed, and Grain Distributers, of which the following is a specification.

My invention relates to machines for the distribution of fertilizers, grain, seed, and the like upon the soil, especially for the distribution of sticky substances, the object being to provide a machine which shall effectually feed the material to the spreader wheel or device and which from such spreader will depost it upon the soil in an effective manner.

One form of distributer according to my invention is represented in the accompanying drawings, in which—

Figure 1:
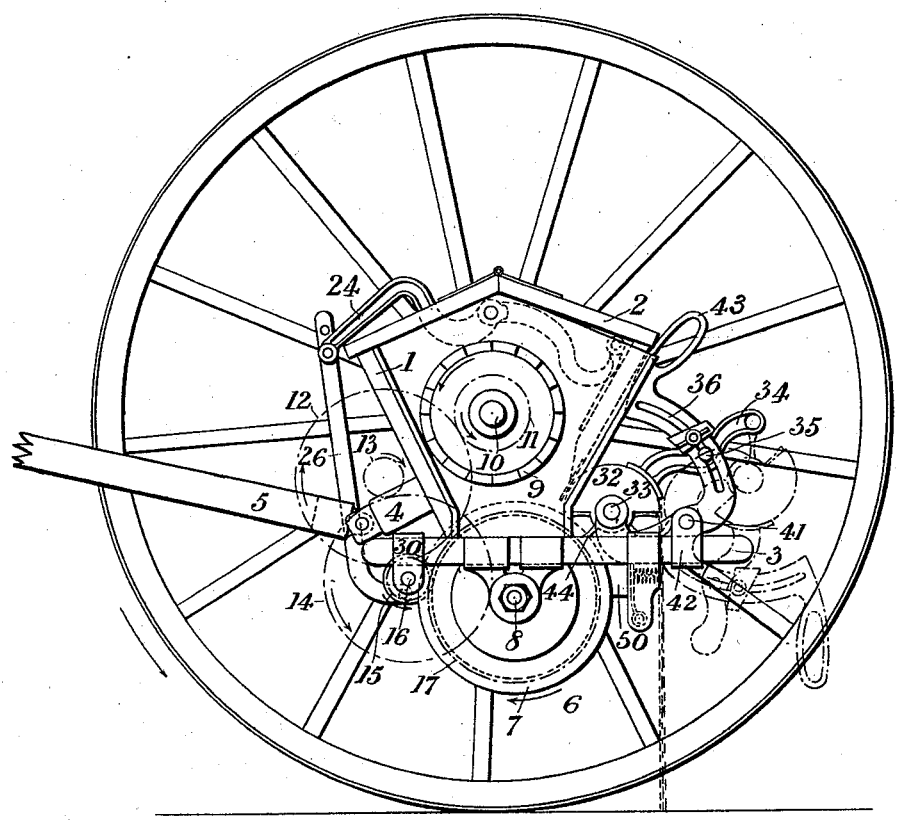
Figure 2:
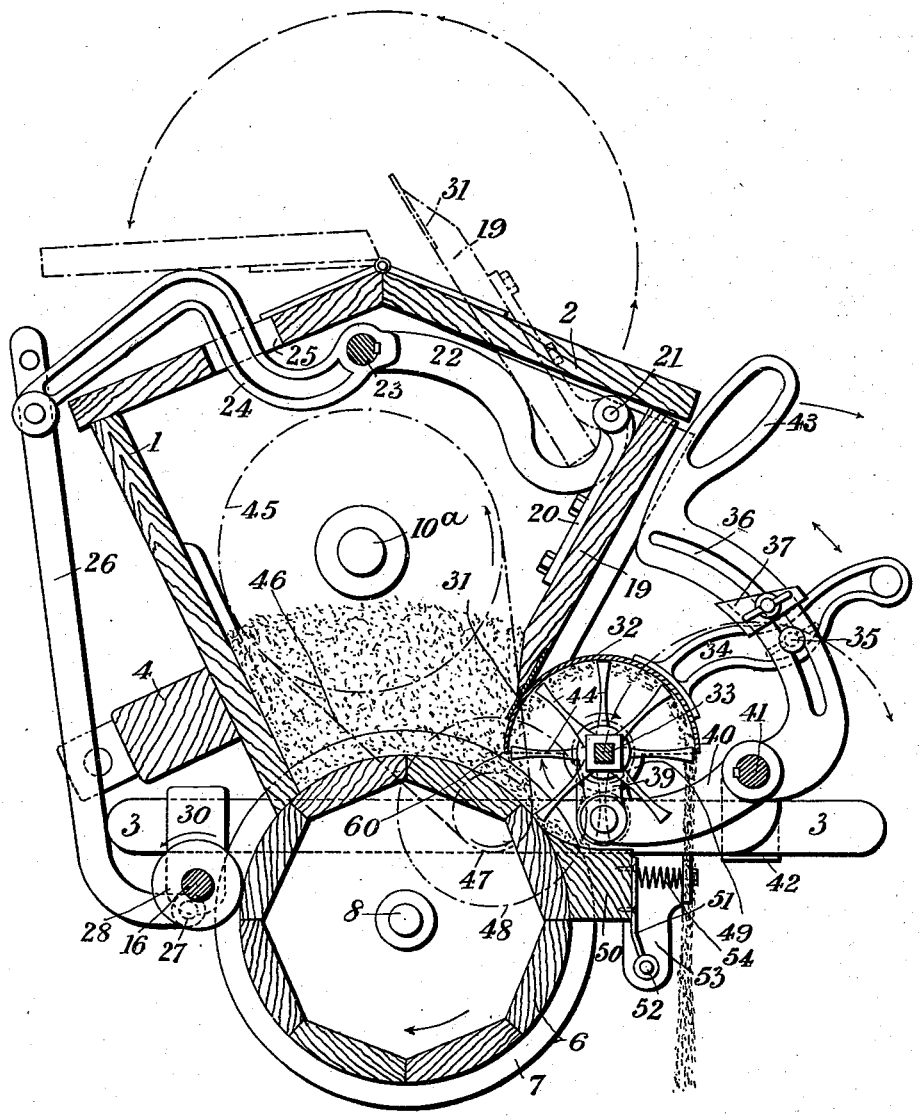

Figure 1 is an end elevation of the machine with one wheel removed; and Fig. 2 is a longitudinal section, on an enlarged scale, of the hopper and working parts.

1 is a hopper having a hinged cover 2 and carrying bar 3, the hopper being supported by the frame of the vehicle. At the front of the hopper is a beam 4, to which are attached the shafts 5. The bottom of the hopper is open, and into it fits, so as to close it, a drum 6, preferably of wood, provided with end flanges 7, which abut against the ends of the hopper. These end flanges form an important feature of the drum, as they constitute to a certain extent a revolving end board and aid in the delivery of the material. The drum is carried by a shaft 8 and is rotated through gearing from a toothed wheel 9, Fig. 1, mounted on a stud 10 outside one of the ends of the hopper and which is driven from the wheel of the vehicle in any manner usual in agricultural machines of this class.

The gearing referred to consists of a pinion 11, attached to the wheel 9, which pinion drives a spur-wheel 12, which through a pinion 13 drives a spur-wheel 14 on a shaft 15, which carries a pinion 16, the latter driving a spur-wheel 17 on the drum-shaft 8. The rear side of the hopper consists of a board or plate 19, Fig. 2, which carries a bracket 20 inside it at each end, such bracket being suspended from a shaft 21, to which is pivotally attached a curved lever 22, the other end of which is attached to a shaft 23 passing through the hopper. To shaft 23 is attached a curved lever 24, which passes through a slot 25 in the cover and is pivotally attached at its end to a connecting-rod 26, the other end of which is carried by a crank-pin 27 on a crank-disk 28 of the shaft 16, which is supported by a bracket 30 on the bar 3. Hence the rotation of shaft 16 will give a reciprocating motion to connecting-rod 26, a rocking motion to shaft 23, and a slow rising-and-falling movement to the hopper side 19. The lower edge of this side is beveled, as at 31, to allow the contents of the hopper to fall down freely. The side 19 at this end rests against a radial hood 32, which forms with its forward edge 60 a gate for controlling the passage of the contents of the hopper out of same. This hood can swing or rotate upon a shaft 33 and is controlled by a lever 34, having a set-screw 35, which engages with a slotted quadrant-arm 36. The quadrant also carries an adjustable stop 37, against which the lever 34 can abut, so that after the latter has been moved for any purpose it can be set again with the original width of opening. Of course for the purpose of moving the lever the set-screw 35 must be first loosed. The shaft 33 is carried in bearings supported by arms 39 and 40, the rearward ends of arms 40 being attached to a rocking shaft 41, said rocking shaft being carried in bearings 42, attached to the rearward end of bar 3.

To the rocking shaft 41 is attached a quadrant 36, which is provided with a handle 43, so that upon pulling down this handle the shaft 41 will be rocked, and the arms 40 will raise the shaft 33 and hood 32 into the position shown by dotted lines in Fig. 1. The shaft 33 also carries the spreader, which consists of a number of arms 44, mounted thereon and capable of revolving inside the hood 32. The rotation of this shaft is accomplished by means of a sprocket-wheel 45, Fig. 2, mounted on the main axle $10^a$ and driven from wheel 9, the chain 46 driving a sprocket-wheel 47, which operates in turn a spur-wheel 48, which drives a pinion 49 on the shaft 33. Beneath the spreader-wheel is a shield or scraper, which in the form shown consists of a block of wood 50, having a face curved to the curvature of the spreader and held by plates 51, hung on pins carried by brackets 53 from the bar 3, a spring 54 between an ear of the bracket and the block serving to keep it in light but sufficient contact with the drum 6.

In operation the width of the outlet-opening from the hopper is adjusted by its radial hood or gate 32 by the lever 34, as described, and the material is carried through such opening and is picked up by the spreader-arms 44, carried around beneath the hood and deposited upon the ground in the manner indicated in the drawings. It will be noticed that this depositing of the material is effected in a different way to that usually adopted where the spreader-wheel in delivering from a hopper always shoots the material underneath and not over same. The result of this is that the material is first projected into the air, and is thus liable to be caught by the wind and either partially blown away or unevenly distributed.

By the overshot arrangement adopted the material is carried around beneath the hood and over the axis of the spreader and thrown vertically downward upon the ground with considerable force, so that it is far less likely to be acted upon by the wind, and a more perfect distribution is thus secured.

The smooth surface of the drum 6 feeds the material forward very effectively, and the reciprocating side 19 prevents the material "arching" or sticking in the hopper by causing it to be continually shaken down. It will be seen that the spreader-wheel and hood may be turned over by means of the handle 41, so as to be out of the way of the hopper side 19 when the latter is to be turned over to disclose the interior of the hopper for cleaning purposes, as indicated in dotted lines, Fig. 2.

What I claim is—

1. A distributer comprising a hopper, a drum in the bottom of same, end flanges to said drum forming revolving end boards by which the delivery of the material to the spreading device is facilitated and a radially-arranged hood forming an adjustable gate for the hopper; substantially as described.

2. The combination with a hopper, a drum forming the bottom of same, a radially-arranged hood forming an adjustable gate for the hopper and a rotating spreader beneath said hood.

3. A distributer comprising a hopper, a suspended side, means for swinging same outwardly for cleaning, a lever connected with said side, means for vibrating said lever, a spreading device, and a hood for same against which the lower edge of the side rests.

4. The combination with a hopper and feeding drum of a spreader, a hood around said spreader, means for carrying the hood and adjusting its position with respect to the hopper to which it acts as a gate, and means for moving the spreader and hood outwardly so that they can be turned out of the way.

5. In combination, a rocking shaft, a spreader-wheel, an arm 39 supporting said spreader-wheel, an arm 40 carried by said rocking shaft and supporting said arm 39, a hood capable of rotation on the axis of the spreader, a lever carried by said hood, a quadrant-arm secured to said rocking shaft and means carried by same for adjusting the position of the lever, such quadrant-arm when pulled serving to turn the rocking shaft and operate said spreader and hood.

6. In a distributer, the combination with the hopper and feeding device, of a hood located adjacent the discharge-opening of said hopper, and a rotating spreader mounted below said hood and coöperating therewith for conveying the discharged contents of the hopper around said hood and forcibly throwing said contents vertically to the ground.

7. In a distributer, the combination with the hopper, of a feeding device comprising a rotatable drum forming the bottom of said hopper, a hood located adjacent the discharge-opening of said hopper, a rotary spreader mounted below said hood and rotating in the same direction as said rotatable drum, and coöperating with said hood for conveying and forcibly throwing the contents of said hopper to the ground.

8. In combination a hopper, a rotating feeding-drum, a rotating spreader, a radial hood around same, and a shield or scraper beneath such spreader and means for holding same lightly up to the drum.

In testimony whereof I have hereunto set my hand in the presence of two subscribing witnesses.

THOMAS CHARLES SARGEANT.

Witnesses:
A. M. TROUP,
W. MAY.